Oct. 29, 1935.  G. F. LONG  2,018,731

CALIPERS

Filed Jan. 5, 1935

INVENTOR
GUY F. LONG
By Adam E. Fisher
ATTORNEY

Patented Oct. 29, 1935

2,018,731

UNITED STATES PATENT OFFICE 2,018,731

CALIPERS

Guy F. Long, Westboro, Mo.

Application January 5, 1935, Serial No. 485

2 Claims. (Cl. 33—148)

This invention relates to improvements in calipers and the main object is to provide an improved form of direct reading or micrometer caliper arranged so that it may be adjusted to a crankshaft of an automobile engine without removing the crankshaft and which will then indicate positively any flattening, unevenness or distortion in that shaft.

Another object is to provide an instrument of this kind comprising a pair of leg members pivotally connected at an intermediate point and bowed outwardly and tapered toward one of the ends of the leg assembly so that the points may fit up against the crankshaft bearing and engage the crankshaft at diametrically opposite points, the other ends of the leg members being also spread or bowed apart and one connected to an arm operating a sliding rack driving the pointer of an indicating device and the other being adjustably connected to a fixed anchor arm extended from the said indicating device whereby as the measuring ends of the legs are spread apart over the crankshaft the pointer will be moved over its scale.

Another object is to provide a device of this kind in a simple, inexpensive and conveniently used form.

With these and other objects in view the invention resides in the novel construction and arrangement of parts as hereinafter fully set forth and claimed, reference being had to the accompanying drawing wherein:

Figure 1:
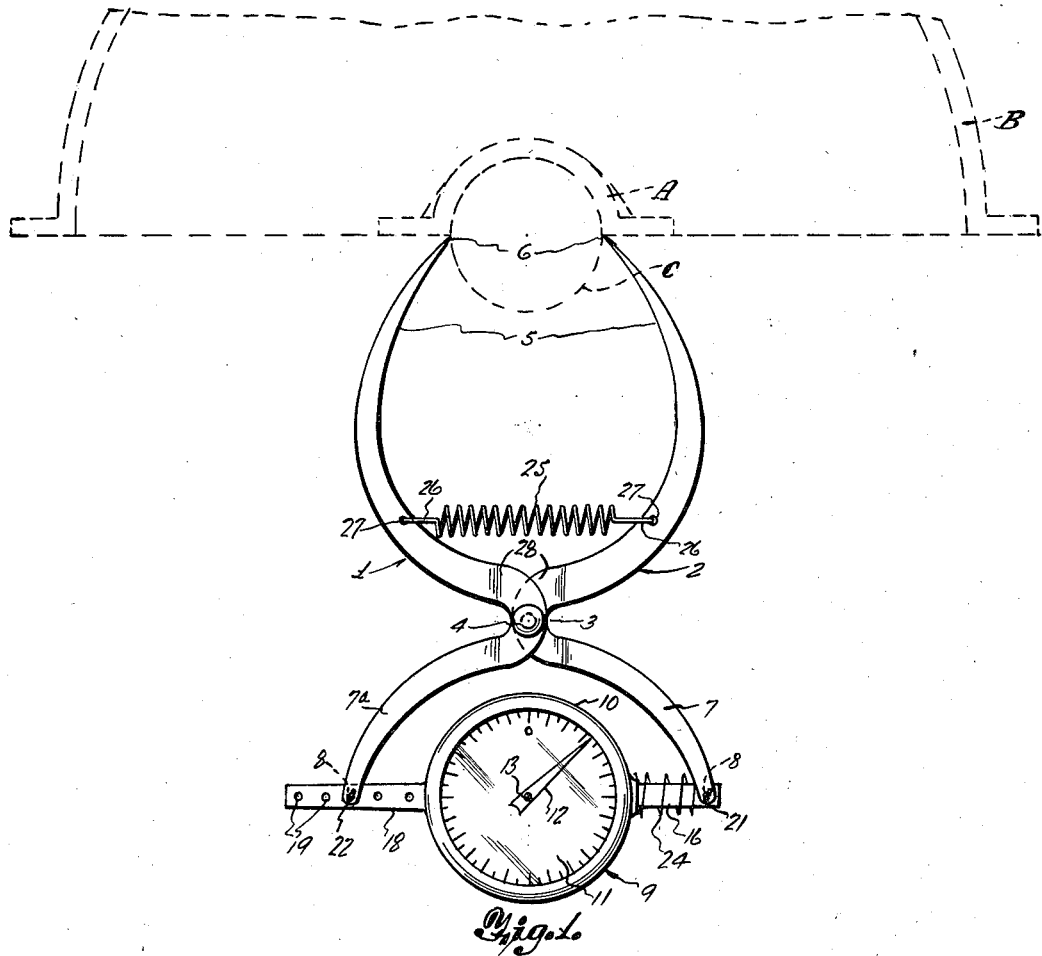
Figure 1 is a view of my invention in use, the automobile crankshaft, bearing, and crankcase being shown in dotted lines.
Figure 2:
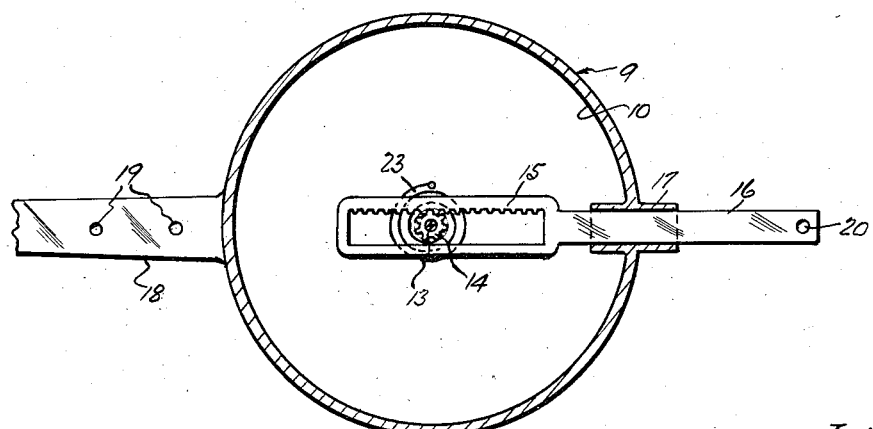
Figure 2 is an enlarged lateral section through the indicating device alone.

Referring now with more particularity to the drawing my invention comprises a pair of leg members designated generally at 1 and 2 and arranged in overlapping arrangement at intermediate points 3 whereby they are pivotally connected by a rivet or similar fastener 4. Outwardly of this pivot connection one end of each leg member is bowed oppositely outward and then inward as shown forming arcuate work engaging ends 5 which are then tapered to a point 6 at their extremities. By this arrangement these points 6 may be placed right up against the upper bearing A of a conventional automobile engine crankcase B and will engage the crankshaft C at diametrically opposite points without removing the shaft from its bearings as would otherwise be necessary. Only the oil pan and lower bearing caps (not shown) are removed greatly simplifying the work.

Below or to the other side of the pivotal connection between the leg members these ends 7 and 7a of the legs are spread relatively widely apart as shown and are apertured at their extremities 8. An indicator designated generally at 9 is provided and comprises a hollow case 10 of the well known "watch case" type with a suitably graduated scale or dial 11 and a pointer 12 journaled by its shaft 13 centrally through this scale. Within the case the shaft 13 carries a pinion 14 meshing with an operating rack 15 which terminates in an operating arm 16 slidably extended out through a bearing 17 in the case 10. An anchor arm 18 is extended from the case 10 oppositely to the operating arm 16 and has a series of spaced apertures 19 while the other arm 16 has a single aperture 20 near its ends as shown.

The spread ends 7 and 7a of the legs are connected to these arms 16 and 18, one end being pivoted by a cotter key 21 or the like to the aperture 20 in the operating arm 16 while the other end 7a is similarly mounted by a key 22 to any one of the apertures 19 in the anchor arm 18.

A smal hair spring 23 within the case 10 is connected to the pointer shaft 13 to normally hold the pointer 12 to zero position on the scale and a light expansion coil spring 24 is placed over the operating arm 16 and braced between the case and leg end 7 to take the play out of the pivotal connection therebetween. A larger and stronger retractile coil spring 25 is hooked at its ends 26 in apertures 27 in the other ends 5 of the legs to normally draw these ends together.

Now as the work engaging ends 5 of the legs 1 and 2 are pulled apart to slip over the crankshaft C the opposite ends 7 and 7a are forced together and the resultant inward movement of the operating arm 16 swings the pointer 12 over the scale 11 through the action of the pinion 14 and rack 15. The pointer thus registers the diameter of the crankshaft if the scale is properly graduated. However, the main function of the instrument is to detect and indicate flatness or unevenness of the crankshaft and it will be readily understood that with the work engaging ends 5 arranged as shown any irregularities in the crankshaft will be indicated by the pointer 12 as the crankshaft is slowly rotated.

The foregoing shape and formation of the legs 1 and 2 provides sharp inwardly directed U-bends 28 which strenghtens the arms greatly and allows the use of relatively light material. These bends 28 are preferably laterally and oppositely offset when they overlie one another whereby the remaining portions of the legs lie in the same plane. The capacity or range of the instrument may be varied by adjusting the leg end 7a to other apertures in the anchor arm 18.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a device of the kind described, a pair of leg members pivotally connected at intermediate points, the said leg members being bowed oppositely and outwardly at one end, the other ends being spread apart, an indicating device comprising a case, a pointer provided on the case, a rack member for operating the pointer and arms oppositely extended from the rack member and case, one of the spread ends of the leg members being pivoted to the arm extended from the rack member, and the other spread end being adjustably connected to the arm extended from the case.

2. In a device of the kind described, a pair of leg members pivotally connected at intermediate points, the said leg members being bowed oppositely and outwardly at one end, the other ends being spread apart, an indicating device comprising a case, a pointer provided on the case, a rack member for operating the pointer and arms oppositely extended from the rack member and case, one of the spread ends of the leg members being pivoted to the arm extended from the rack member, and the other spread end being adjustably connected to the arm extended from the case, the said bowed ends of the leg members being turned inwardly and tapered to points at their extremities to engage the work, and a coil spring stretched between the said bowed ends to normally pull the same together.

GUY F. LONG.